United States Patent Office  
3,000,920  
Patented Sept. 19, 1961

3,000,920  
NITRAZAISOCYANATES  
Milton B. Frankel, Pasadena, Calif., assignor to Aerojet-General Corporation, Azusa, Calif., a corporation of Ohio  
No Drawing. Filed June 9, 1955, Ser. No. 514,384  
23 Claims. (Cl. 260—453)

This invention relates to new compositions of matter and a method for their preparation. In particular, it relates to nitraza-isocyanates having the general formula:

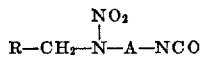

wherein R is a hydrogen, nitroalkyl or alkyl radical, and A is an alkylene radical.

The compounds of this invention are prepared by reacting a nitraza-acid halide with an alkali or alkaline earth metal azide to form the corresponding nitraza-azide, which is then heated under anhydrous conditions to effect rearrangement to the desired nitraza-isocyanate, in accordance with the general reaction scheme set forth below:

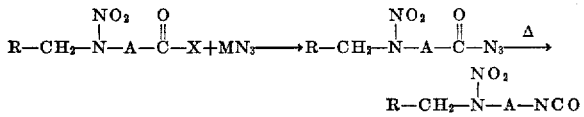

wherein R and A are as defined above, X is a halogen radical, and M is an alkali or alkaline earth metal.

As a matter of convenience, the nitraza-acid chlorides are usually employed as the starting material. Optimum results are obtained when the reaction temperature is maintained below room temperature during the formation of the nitraza-azide; however, higher temperatures can be employed if desired. Increased smoothness and control of the reaction are achieved when a reaction media such as water, acetic acid, acetone or chloroform or mixtures thereof is used. Rearrangement of the nitraza-azide to the nitraza-isocyanate takes place even at low temperatures, however, the reaction is slow and therefore it is preferred to conduct the reaction at room temperature or above.

The nitroalkyl-nitraza-acid halides used as starting materials in the practice of this invention are obtained by reacting a thionyl halide with nitroalkyl-nitraza-acids which are readily obtained by reacting the corresponding nitroalkyl-aza-acids with nitric acid. Suitable nitroalkyl-aza-acids are prepared by condensing nitroalcohols with amino acids, as more fully disclosed is assignee's copending application Serial No. 416,385, filed March 15, 1954, now abandoned.

The alkyl-nitraza-acid halides used as starting materials are obtained by reacting a thionyl halide with the corresponding acids, which are prepared by the acid hydrolysis of nitraza-nitriles, as disclosed in my copending application Serial No. 514,386, filed June 9, 1955.

The metal azides useful in the practice of this invention are the alkali metal azides such as sodium azide and the alkaline earth metal azides.

To more clearly illustrate my invention, the following examples are presented. The preparation of the starting material is included in order to illustrate the method of converting an aza-acid to a nitraza-acid halide. It should be understood that these examples are presented merely as a means of illustration and are not intended to limit the scope of the invention in any way.

EXAMPLE I

Preparation of 2,4,4-trinitro-2-aza-amyl isocyanate 3,5,5-trinitro-3-aza-hexanoic acid.—A mixture of 500 ml. of 100% nitric acid and 500 ml. of acetic anhydride was stirred at 5° C., and 273 gm. of ethyl 5,5-dinitro-3-aza-hexanoate was added while maintaining the temperature below 10° C. After 40 minutes the acid solution was poured onto ice. The oil was extracted with methylene chloride, and the extracts were dried and concentrated in vacuo, leaving an amber colored oil. This oil was heated with 1000 ml. of concentrated hydrochloric acid on the steam bath for 20 hours. On cooling, 90 gm. (35%) of white solid separated, M.P. 122–126° C. Recrystallization from ethylene dichloride gave 54 gm. of product, 3,5,5-trinitro-3-aza-hexanoic acid, M.P. 139–140° C. An elemental analysis of the product is as follows:

Calculated for $C_5H_8N_4O_8$: percent C, 23.82; percent H, 3.20; percent N, 22.22. Found: percent C, 23.96; percent H, 3.25; percent N, 22.56.

3,5,5-trinitro-3-aza-hexanoyl chloride.—A mixture of 5 gm. (0.02 mole) of 3,5,5-trinitro-3-aza-hexanoic acid and 25 ml. of redistilled thionyl chloride was refluxed for 8.5 hours, and concentrated in vacuo, leaving 5.2 gm. (96.8%) of white solid, M.P. 85–87° C. Recrystallization from carbon tetrachloride raised the melting point to 87–88° C. The elemental analysis of the product is as follows:

Calculated for $C_5H_7N_4O_7Cl$: percent C, 22.19; percent H, 2.61; percent N, 20.71; percent Cl, 13.10. Found: percent C, 22.65; percent H, 2.95; percent N, 21.27; percent Cl, 13.89.

2,4,4-trinitro-2-aza-amyl isocyanate.—A solution of 35.1 gm. (0.54 mole) of sodium azide in 250 ml. of water was placed in a 1-liter 3-necked flask, fitted with a thermometer, mechanical stirrer, and dropping funnel. The solution was cooled to 5° C. with an ice-bath, and a solution of 73 gm. (0.27 mole) of 3,5,5-trinitro-3-aza-hexanoyl chloride in 200 ml. of acetone was added dropwise, keeping the temperature below 10° C. The reaction mixture was stirred for 30 minutes and extracted with three 150-ml. portions of chloroform. The extracts were combined, and successively washed with two 100-ml. portions of water, two 100-ml. portions of 10% sodium bisulfate and two 100-ml. portions of water. The chloroform solution was dried for 30 minutes over sodium sulfate and placed in a 1-liter round-bottom flask arranged for distillation. About 100 ml. of chloroform was stripped off with the water aspirator to remove the last traces of water. The temperature was raised to 60–65° C. with the steam-bath and the azide was decomposed at atmospheric pressure. Dry chloroform was added periodically to keep the volume constant. After the nitrogen evolution had ceased the solution was cooled to −10° C. causing a white solid to separate. The product was collected and dried. The yield of 2,4,4-trinitro-2-aza-amyl isocyanate was 48.1 gm. (72%) M.P. 97–100° C. Recrystallization from ethylene dichloride raised the melting point to 102–103° C. The compound explodes violently on standing at room temperature but can be safely stored at −20° C.; for synthetic purposes it is best used in solution without being isolated. The elemental analysis of the product is as follows:

Calculated for $C_5H_7N_5O_7$: percent C, 24.10; percent H, 2.83; percent N, 28.11. Found: percent C, 24.31; percent H, 3.11; percent N, 28.05.

EXAMPLE II

Preparation of 3-nitrazabutyl isocyanate

A solution of 167 gm. (1 mole) 4-nitrazapentanoyl chloride in 150 ml. chloroform was added slowly with vigorous stirring to a solution of 130 gm. (2 moles) sodium azide in 390 ml. water while the temperature was maintained at 10–15° C. The mixture was stirred for an additional 30 minutes at 10° C., and the phases were then separated. The aqueous layer was extracted with an additional 150 ml. chloroform, and the combined organic phases were washed with water and dried over anhydrous sodium sulfate. The drying agent was removed by filtration, and the azide was rearranged on gently warming the filtrate on the steam-bath. After complete decomposition of the azide, the solution was concentrated by distillation in vacuo, and the viscous, oily residue (133 gm.; 91.8%) crystallized on storage in the deep freeze. The product was recrystallized three times from absolute ether prior to analysis. The 3-nitraza-butyl isocyanate melted at 25–26° C. The elemental analysis of the product is as follows:

Calculated for $C_4H_7O_3N_3$: percent C, 33.10; percent H, 4.86; percent N, 28.96. Found: percent C, 32.85; percent H, 4.53; percent N, 29.69.

The isocyanates of this invention readily condense with nitroalcohols such as trinitroethanol to form nitro-substituted carbamates, as disclosed in my copending application Serial No. 514,382, filed June 9, 1955. The polynitro carbamates thus obtained are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

A wide variety of compounds can be prepared in accordance with the procedure set forth in the above examples. 2,4-dinitro-2-aza-butyl isocyanate, 2,4,4-trinitro-2-aza-heptyl isocyanate, 2,4,4,6,6-pentanitro-2-aza-heptyl isocyanate, 4,6,6-trinitro-4-aza-heptyl isocyanate and 3-nitraza-pentyl isocyanate are prepared by reacting 3,5-dinitro-3-aza-pentanoyl chloride, 3,5,5-trinitro-3-aza-octanoyl chloride, 3,5,5,7,7-pentanitrol-3-aza-octanoyl chloride, 5,7,7-trinitro-5-aza-octanoyl chloride and 4-nitraza-hexanoyl chloride, respectively, with sodium azide and heating the resulting azides under anhydrous conditions to effect rearrangement.

It is apparent that any member of the disclosed series of nitraza isocyanates can be prepared by reacting the appropriate nitraza acid halide with metal azides and heating under anhydrous conditions, in accordance with the teachings of this invention.

I claim:

1. As compositions of matter, nitraza-isocyanates having the formula:

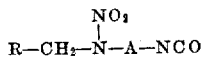

wherein R is a radical selected from the group consisting of hydrogen, lower alkyl and lower nitroalkyl radicals and A is a lower alkylene radical.

2. As compositions of matter, nitraza-isocyanates having the formula:

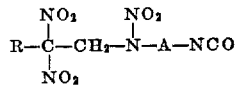

wherein R is a radical selected from the group consisting of hydrogen, lower alkyl and lower nitroalkyl radicals and A is a lower alkylene radical.

3. As a composition of matter, 2,4,4-trinitro-2-aza-amyl isocyanate having the structural formula:

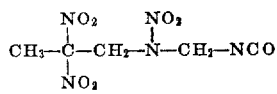

4. As a composition of matter, 2,4-dinitro-2-aza-butyl isocyanate having the structural formula:

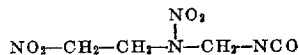

5. As a composition of matter, 2,4,4-trinitro-2-aza-heptyl isocyanate having the structural formula:

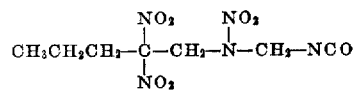

6. As a composition of matter, 4,6,6-trinitro-4-aza-heptyl isocyanate having the structural formula:

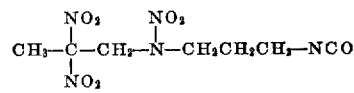

7. As a composition of matter, 2,4,4,6,6,-pentanitro-2-aza-heptyl isocyanate having the structural formula:

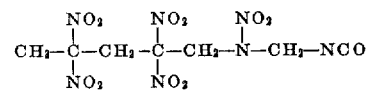

8. As a composition of matter, 3-nitraza-butyl isocyanate having the structural formula:

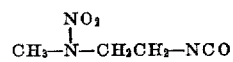

9. As a composition of matter, 3-nitraza-pentyl isocyanate having the structural formula:

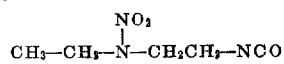

10. The method of preparing a nitraza-isocyanate having the formula:

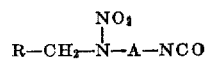

which comprises reacting a nitraza-acid halide with a metal azide selected from the group consisting of alkali and alkaline earth metal azides and subsequently heating the resultant azide under anhydrous conditions to effect rearrangement to the desired isocyanate, wherein R is a radical selected from the group consisting of hydrogen, lower alkyl and lower nitroalkyl radicals and A is a lower alkylene radical.

11. The method of claim 10 wherein the said reaction is conducted in the presence of a solvent selected from the group consisting of water, acetic acid, acetone, and chloroform, and mixtures thereof.

12. The method of claim 10 wherein said reacting is conducted at reduced temperature.

13. The method of preparing nitraza-isocyanates having the formula:

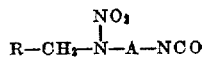

which comprises reacting an azide selected from the group of metal azides consisting of alkali and alkaline earth metal azides with a nitraza-acid halide having the formula:

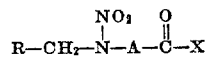

wherein R is a lower nitroalkyl radical, A is a lower alkylene radical, and X is a halogen radical, and subsequently heating under anhydrous conditions to effect arrangement of the resulting nitraza-azide.

14. The method of claim 13 wherein said nitraza-acid halide is a nitraza-acid chloride.

15. The method of preparing nitraza-isocyanates having the formula:

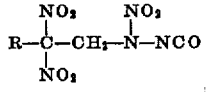

wherein R is a lower alkyl radical and A is a lower alkylene radical, which comprises reacting an amino-acid having the formula:

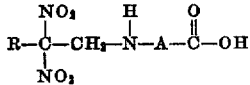

with nitric acid to form a nitraza-acid having the formula:

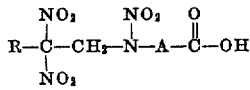

and reacting said nitraza-acid with a thionyl halide to form a nitraza-acid halide having the formula:

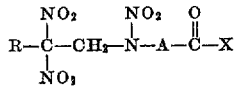

wherein X is a halogen radical, and reacting said nitraza-acid halide with an azide selected from the group of metal azides consisting of alkali and alkaline earth metal azides to form a nitraza-azide having the formula:

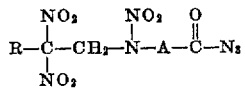

and subsequently heating said nitraza-azide under anhydrous conditions to effect rearrangement to the desired nitraza-isocyanate.

16. The method of preparing nitraza-isocyanates having the formula:

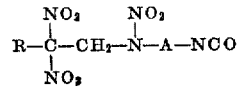

wherein R is a lower alkyl radical and A is a lower alkylene radical, which comprises reacting an alkali metal azide with an amino-acid halide having the formula:

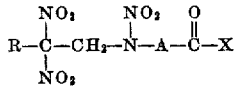

wherein X is a halogen radical, and subsequently heating the resulting azide under anhydrous conditions to effect rearrangement to the desired isocyanate.

17. The method of preparing 2,4,4-trinitro-2-aza-amyl isocyanate which comprises reacting 3,5,5-trinitro-3-aza-hexanoyl chloride with sodium azide and heating under anhydrous conditions to effect rearrangement to the desired isocyanate.

18. The method of preparing 2,4-dinitro-2-aza-butyl isocyanate which comprises reacting 3,5-dinitro-3-aza-pentanoyl chloride with sodium azide and heating under anhydrous conditions to effect rearrangement to the desired isocyanate.

19. The method of preparing 2,4,4-trinitro-2-aza-heptyl isocyanate which comprises reacting 3,5,5-trinitro-3-aza-octanoyl chloride with sodium azide and heating under anhydrous conditions to effect rearrangement to the desired isocyanate.

20. The method of preparing 2,4,4,6,6-pentanitro-2-aza-heptyl isocyanate which comprises reacting 3,5,5,7,7-pentanitro-3-aza-octanoyl chloride with sodium azide and heating under anhydrous conditions to effect rearrangement to the desired isocyanate.

21. The method of preparing 4,6,6-trinitro-4-aza-heptyl isocyanate which comprises reacting 5,7,7-trinitro-5-aza-octanoyl chloride with sodium azide and heating under anhydrous conditions to effect rearrangement to the desired isocyanate.

22. The method of preparing 3-nitraza-pentyl isocyanate which comprises reacting 4-nitraza-hexanoyl chloride with sodium azide and heating under anhydrous conditions to effect rearrangement to the desired isocyanate.

23. The method of preparing 3-nitraza-butyl isocyanate which comprises reacting 4-nitraza-pentanoyl chloride with sodium azide and heating under anhydrous conditions to effect rearrangement to the desired isocyanate.

No references cited.